3,488,719
PROCESS FOR THE MANUFACTURE OF COMPOUNDS OF TRIVALENT PHOSPHORUS
Marianne Baudler, Cologne, and Dietmar Schellenberg, Cologne-Mulheim, Germany, assignors to Knapsack Aktiengesellschaft, Knapsack, near Cologne, Germany, a corporation of Germany
No Drawing. Filed Sept. 27, 1966, Ser. No. 582,232
Claims priority, application Germany, Oct. 30, 1965, K 57,531
Int. Cl. B01k 1/00; C01b 25/16
U.S. Cl. 204—90
12 Claims

ABSTRACT OF THE DISCLOSURE

A process for producing trivalent phosphorus compounds from pentavalent phosphorus compounds by electrolytic reduction of the raw material in indicated organic solvents, solutions of pentavalent material containing less than 10% by weight of water.

---

The commercial production of trivalent phosphorus compounds, which are gaining increasing interest for the synthesis of insecticides, textile auxiliary agents, additives, and similar materials, has generally been carried out heretofore via the phosphorus trichloride stage. A disadvantage associated with this process resides in the considerable amounts of hydrogen chloride generally obtained as a by-product. This results firstly in additional expense accruing from protection against corrosion, treatment or removal of this by-product. Secondly, the hydrogen chloride is sometimes found to favor undesirable side reactions and thus to impair the yield of the trivalent phosphorus compounds desired to be produced.

It is known that an aqueous orthophosphoric acid solution cannot be reduced by cathodic treatment; the water alone undergoes decomposition. Electrolysis of the anhydrous acid is found again to give $H_2$ and $O_2$ in the molar ratio of 2:1, and to entail partial condensation accompanied by the formation of polyphosphoric acids.

The electrolysis of orthophosphoric acid in an ethereal solution has long been held in the art to result in the formation of oxygen at the anode and in the formation of hydrogen at the cathode with the acid itself remaining unchanged.

The present invention is based on the unexpected observation that compounds of trivalent phosphorus can be prepared by subjecting compounds of pentavalent phosphorus to electrolytic reduction, preferably while adding a solvent, and at a water content of less than 10% by weight, advantageously of less than 1% by weight. In this manner, it is even possible to subject to the electrolysis the reaction products of the solvent with the starting product containing pentavalent phosphorus. Especially good results are obtained e.g. with the use of $P_2O_5$ in an alcohol provided that the pentavalent phosphorus compound is employed in the form of a saturated solution. The solvents useful for carrying out the present process include e.g. monohydric and polyhydric alcohols, such as methanol, ethanol, glycol and glycerol, or ethers, e.g. diethylether, or ketones, e.g. acetone, or sulfones, e.g. tetramethylene sulfone. Useful pentavalent phosphorus compounds include orthophosphoric acid, preferably with a strength of at least 85% by weight, alkali metal phosphates, polyphosphoric acids, phosphorus pentoxide, and acid phosphoric acid esters. Improved yields are obtained when all agent capable of binding water, e.g. $P_2O_5$, a polyphosphoric acid or a polyphosphoric acid ester, such as triethyl phosphate, is added to the pentavalent phosphorus compound to be reduced. Substances which improve the conductivity of the electrolyte, e.g. ammonium ions comprising ammonium phosphates and ammonium alkyl salts, and which are chemically inert under the conditions of the electrolysis, can also be added. Of course, this depends on the solvent used. Increased yields of trivalent phosphorous compounds are also obtained when the reaction is carried out at temperatures varying between 25 and 150° C., preferably between 50 and 150° C., rather than at room temperature. The present process can be achieved in the presence or absence of a diaphragm. The electrodes used include customary, conventional electrodes, particularly lead cathodes. The temperature to be selected depends again on the solvent used.

EXAMPLE 1

2 grams crystallized orthophosphoric acid were dissolved in 20 cc. absolute ethanol and 2 cc. triethyl phosphate were added. The electrolytic cell which included a reflux condenser was placed in a thermostat at 70° C. and a 14 volt DC-voltage was impressed on the lead electrodes. An initial current intensity of 22 ma. was obtained which slightly increased during the electrolysis. Small amounts of P (III) and P (I) could be detected by gas chromatography at a curent intensity of 58 ma. As the electrolysis continued, the current intensity was found to increase up to 65 ma. The proportion of P (III) increased to 38% by weight, referred to the P(V)-compound used; the proportion of P (I) increased but slightly.

EXAMPLE 2

A solution having the composition described in Example 1 was electrolyzed at 25° C. (thermostat) instead of at 70° C. The final concentration of P (III), referred to the P (V) compound used, was not higher than 10% by weight, and traces of P (I) were found.

EXAMPLE 3

3.6 cc. orthophosphoric acid of 85% strength were dissolved in 26 cc. ethanol (98% strength) and electrolyzed at 25° C. (thermostat) at lead electrodes. The impressed DC-voltage of 14 volts was found to increase to about 185 ma. It was obvious that initially the water underwent decomposition. After some time, P (III) was identified by gas chromatography. 8.7% by weight P (III), referred to the P (V)-compound used, were found after 65 hours. The yield was not materially improved even by prolonged electrolysis.

EXAMPLE 4

3.5 grams $Na_2HPO_4 \cdot 2H_2O$ were dissolved in 20 cc. glycerol (German pharmacopeia No. 6) while hot. After having been allowed to cool, the solution was electrolyzed at 25° C. (thermostat) at a voltage of 14 volts at lead electrodes. After some hours, at a current intensity of 40 ma., the P (III)-proportion in the phosphorus compound used was found to be 21% by weight which could be slightly increased by continuing the electrolysis.

EXAMPLE 5

A saturated solution (with solid phase) of phosphorus pentoxide in ethanol of 98% strength was prepared and electrolyzed at lead electrodes at 25° C. (thermostat). After 100 hours, only some minor amounts of P (V) and P (V)—O—P(V) compounds were found. P (III) and P (I)-compounds were, however, present in a proportion of 40 and 45% by weight, respectively, referred to the $P_2O_5$ used.

It is finally noted that the trivalent phosphorus compounds produced may sometimes appear in the electrolyzed products in the form of P (III)—O—P(V)-compounds which, however, can successively be transformed by hydrolysis into P (III)-compounds.

We claim:
1. A process for the production of trivalent phosphorus compounds from pentavalent phosphorus compounds, which comprises electrolytically reducing a pentavalent phosphorus compound dissolved in organic solvent, the solution being treated containing less than 10 weight percent water.
2. The process of claim 1 wherein the water content is les than 1% by weight.
3. The process of claim 1 wherein the organic solvent is a monohydric alcohol, polyhydric alcohol, ether, ketone or sulfone.
4. The process of claim 1 wherein the solvent is a member selected from the group consisting of methanol, ethanol, glycol, glycerol, diethylether, acetone and tetramethylene sulfone.
5. The process of claim 1 wherein the pentavalent phosphorus compound is a member selected from the group consisting of orthophosphoric acid, alkali metal phosphate, polyphosphoric acid, phosphorus pentoxide, and acid phosphoric acid ester.
6. The process of claim 5 wherein the pentavalent phosphorus compound is at least 85% by weight orthophosphoric acid.
7. The process of claim 1 wherein a water binding agent is added to the pentavalent phosphorus compound to be reduced.
8. The process of claim 7 wherein the water-binding agent is a member selected from the group consisting of $P_2O_5$, polyphosphoric acid and phosphoric acid ester.
9. The process of claim 1 wherein the reduction is carried out at a temperature of 25–150° C.
10. The process of claim 1 wherein a substance chemically inert under the conditions of the electrolysis and conducive to improving the conductivity of the electrolyte is added to the pentavalent phosphorus compound to be reduced.
11. The process of claim 10 wherein the chemically inert substance is a substance containing ammonium ions.
12. The process of claim 11 wherein the substance containing ammonium ions is at least one member selected from the group consisting of ammonium phosphates and ammonium alkly salts.

References Cited

UNITED STATES PATENTS

| | | |
|---|---|---|
| 2,880,063 | 3/1959 | Baniel et al. |
| 3,388,967 | 6/1968 | Ramaradhya. |

FOREIGN PATENTS

| | | |
|---|---|---|
| 1,130,548 | 10/1956 | France. |
| 1,114,190 | 9/1961 | Germany. |

OTHER REFERENCES

Latimer: Oxidation Potentials, copyright 1938, pages 99 and 295.

JOHN H. MACK, Primary Examiner

D. R. JORDAN, Assistant Examiner

U.S. Cl. X.R.

204—101, 103